(12) United States Patent
Falchuk et al.

(10) Patent No.: US 8,694,901 B2
(45) Date of Patent: Apr. 8, 2014

(54) METHOD AND SYSTEM FOR MASHING UP AND PRESENTING CONTEXTUAL SUGGESTIONS TO MOBILE USERS

(75) Inventors: Benjamin W. Falchuk, Upper Nyack, NY (US); Shoshana K. Loeb, Philadelphia, PA (US)

(73) Assignee: Telcordia Technologies, Inc., Piscataway, NJ (US)

( * ) Notice: Subject to any disclaimer, the term of this patent is extended or adjusted under 35 U.S.C. 154(b) by 1082 days.

(21) Appl. No.: 12/182,636

(22) Filed: Jul. 30, 2008

(65) Prior Publication Data

US 2009/0037832 A1    Feb. 5, 2009

Related U.S. Application Data

(60) Provisional application No. 60/962,566, filed on Jul. 30, 2007.

(51) Int. Cl.
*G06F 9/46* (2006.01)
*G06F 3/048* (2013.01)

(52) U.S. Cl.
USPC .......................................... 715/764; 719/318

(58) Field of Classification Search
USPC ......................................... 715/864, 710, 859
See application file for complete search history.

(56) References Cited

U.S. PATENT DOCUMENTS

| | | | |
|---|---|---|---|
| 7,877,356 B1 * | 1/2011 | Guiheneuf et al. | 707/622 |
| 2004/0078256 A1 * | 4/2004 | Glitho et al. | 705/8 |
| 2004/0204150 A1 * | 10/2004 | Cho | 455/567 |
| 2006/0294191 A1 | 12/2006 | Marston et al. | |
| 2007/0035390 A1 | 2/2007 | Thomas et al. | |
| 2007/0180060 A1 * | 8/2007 | Patel et al. | 709/219 |
| 2007/0219875 A1 * | 9/2007 | Toulotte | 705/26 |
| 2008/0086455 A1 * | 4/2008 | Meisels et al. | 707/3 |
| 2008/0091463 A1 * | 4/2008 | Shakamuri | 705/2 |

OTHER PUBLICATIONS

International Search Report, dated Nov. 10, 2008.

* cited by examiner

*Primary Examiner* — William Bashore
*Assistant Examiner* — Jeanette J Parker
(74) *Attorney, Agent, or Firm* — Philip J. Feig (57) ABSTRACT

An inventive system and method for determining and presenting contextual suggestions on a mobile device is presented. The invention comprises a server having an incoming context handler, and a context presentation manager, a notifier, and a goal resolution component all on the mobile device, and user context, wherein the incoming context handler emits an event toward the mobile device, the goal resolution component determines the event causes a change in the user context and forwards notification to the context presentation manager, the notifier receives notification, renders notification on the mobile device, and presents the contextual suggestions based on the change in the user context on the mobile device. The system may further comprise a goal inferral component operable to determine detailed user context based on the event. In one embodiment, the notifier renders notification by causing the mobile device to vibrate, display multiple colors and/or emit sounds.

14 Claims, 9 Drawing Sheets

METHOD AND SYSTEM FOR MASHING UP AND PRESENTING CONTEXTUAL SUGGESTIONS TO MOBILE USERS

CROSS REFERENCE TO RELATED APPLICATION

The present invention claims the benefit of U.S. provisional patent application 60/962,566 filed Jul. 30, 2007, the entire contents and disclosure of which is incorporated herein by reference.

FIELD OF THE INVENTION

The present invention relates generally to ontology driven systems executable in mobile host environments.

BACKGROUND OF THE INVENTION

There are many online appointment, tasks, and calendar systems that afford easy entry, as well as time-based reminders, such as Yahoo! calendar, Google calendar, Remember the Milk, Oh don't Forget, etc. In addition, several such systems target the mobile user, including those that have software components that run on mobile operating systems. Further, some systems exploit GPS capabilities and provide location-sensitive task reminders.

The typical use of such systems requires user interaction as follows. The user must initially go to a website and signup or enroll. After enrolling, the user enters one or more reminders either in structured form, using a calendar widget, etc., or as free text, e.g. text such as, "pickup Bob, 3 pm today". Then, the system updates its internal state, and, at the correct moment, sends a notification towards the user, and possibly other users, based on some preconfigured endpoint address or series of addresses, such as a mobile phone number. A user can continue to enter multiple reminders over time, if desired, and the system will update itself and notify the user accordingly.

In addition to various calendaring systems and sites described above, Web "mash-up" sites exist. A Web mash-up site is a site that pulls in data from various providers and presents them together, usually on a map, but not necessarily.

Current art has limitations. In particular, these systems do not distinguish, or even understand, the difference between reminders from one realm with respect to another. For example, they cannot determine whether a wellness reminder, such as "take your aspirin now", has the same semantics as a reminder such as "your favorite TV show is on now". Also, there is not sufficient information captured by these systems to be able to distinguish events such as meeting with a doctor as opposed to meeting with my boss, to know how to handle them and when it is appropriate to present them.

In addition, these systems offer very little human-computer interface sophistication. Typical the systems simply send Short Message Service (SMS) with some message as a payload within the SMS. The systems do not generally make inference, e.g., recognize that one condition leads to another, etc., and the handling of longer term, composite goals (sub-goals, sub-sub-goals . . . ) is not available. Accordingly, calendar and notification systems are rarely able to exploit user's fine-grained location, user's long term goals, user's short term goals, e.g. current location, or a current set of tasks in progress and to be completed. As a result, notification systems are purely reactive and do not take proactive measures or make suggestions to the user that seem intelligent, nor do they largely make notifications that were not scripted or scheduled explicitly a priori by the end-user herself. For example, these systems can suggest the next immediate task, but not beyond, and they do not understand which sorts of notifications are subsumed by others or have differing priority than others.

What is needed is a system and method capable of providing a more elaborate model of, and management method for, user context. Such a system could provide the right reminder at the right time and place, as well as mitigating conflicting and complementary reminders and events. Such context and features could be provided by, for example, performing "context mash-up". By user "context" we mean a machine readable version of the multitude of information surrounding the daily life of a user. We are not limited by any specific type of user context so long as it is well-formed and understood. Examples of user context include user information such as phone number, calendar appointments, physical location, notes, and personal goals, e.g., on matters such as life, financial, wellness, and so on.

SUMMARY OF THE INVENTION

The inventive system and method harnesses networked resources and establishes a global view of state that is relevant to every individual user. The inventive system for determining and presenting contextual suggestions on a mobile device comprises a server, an incoming context handler residing on the server, a context presentation manager residing on the mobile device, a notifier residing on the mobile device, a goal resolution component residing on the mobile device, and user context, wherein the incoming context handler emits an event toward the mobile device, the goal resolution component determines the event causes a change in the user context and forwards notification to the context presentation manager, the notifier receives the notification from the context presentation manager and renders the notification on the mobile device and presents the contextual suggestions based on the change in the user context on the mobile device. The system can further comprise a visual interface, residing on either the server or the mobile device, enabling user input to the server. The system can further comprise a goal inferral component operable to determine detailed user context based on the event. In one embodiment, the notifier renders the notification by causing the mobile device to vibrate, display multiple colors, and/or emit sounds. In one embodiment, the goal resolution component determines the event causes a change in the user context based on the user context and rules. In one embodiment, the context-presentation manager queues up the notification until an appropriate time. In one embodiment, the contextual suggestions are presented in a hierarchical layout of differing types of the suggestions, such as information type, goal achieved, time, and importance. The differing suggestion types can be organized and presented so as to mirror the important contexts of the user's life, e.g., wellness, finance, daily chores, etc. The differing suggestions can be presented and browsed in aggregated form, i.e., by viewing a node higher up in the ontology, or in detailed individual form, i.e., by viewing a leaf.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION OF THE INVENTION

Figure 1:
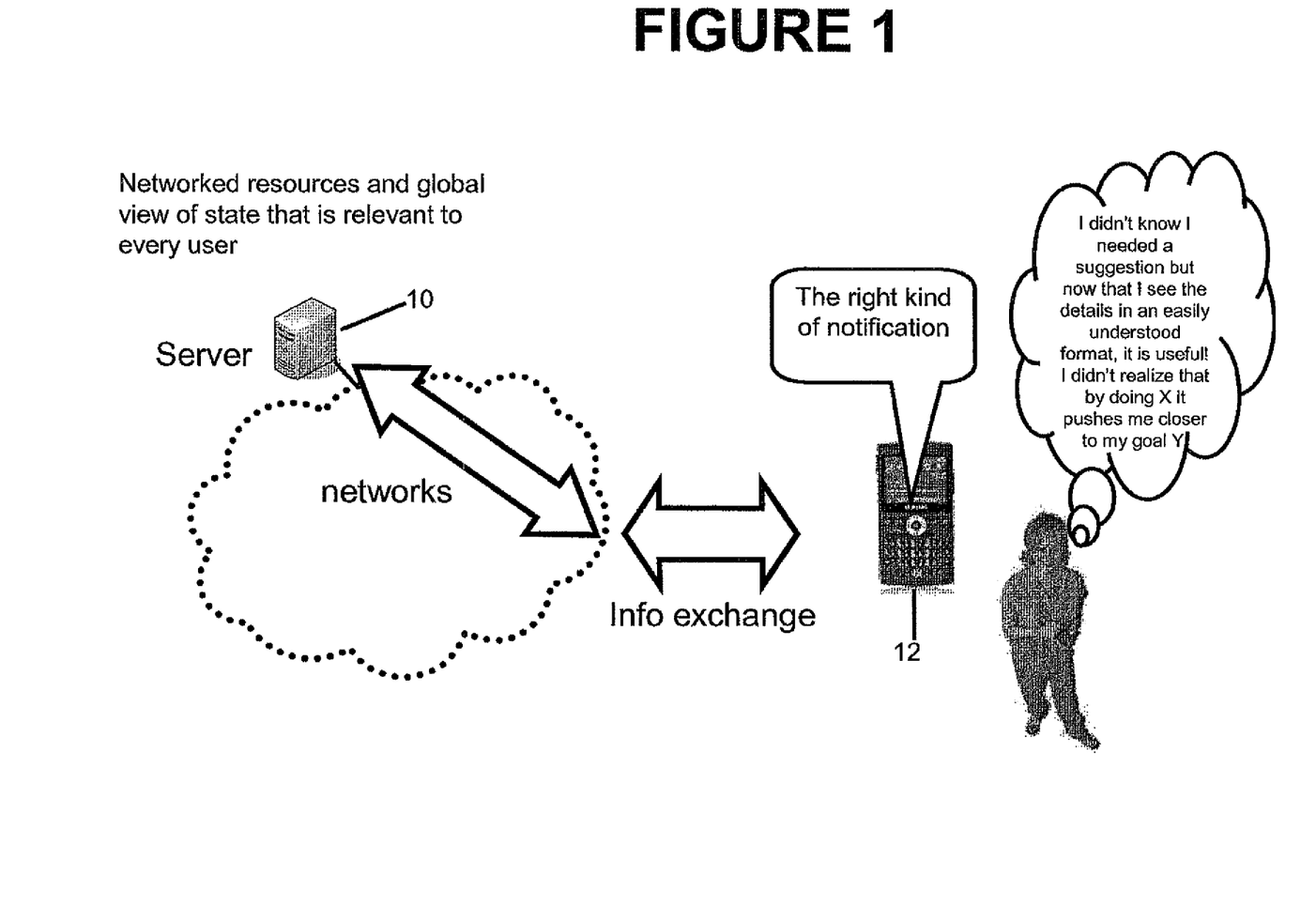
FIG. 1 is a schematic of the present invention.

An inventive system and method for mashing up and presenting contextual suggestions to mobile users is presented. FIG. 1 is a schematic of the present invention having a server 10 and a client or mobile device 12, such as a mobile telephone or handset. The server 10 can be an external system, or some separate internal, e.g. also resident on the mobile phone, component such as a GPS location tracker that emits events of interest to the system. With such an inventive system and method, a user would recognize that "I didn't know I needed a suggestion but now that I see the details in an easily understood format, it is useful! I didn't realize that by doing X it pushes me closer to my goal Y."

Figure 2:
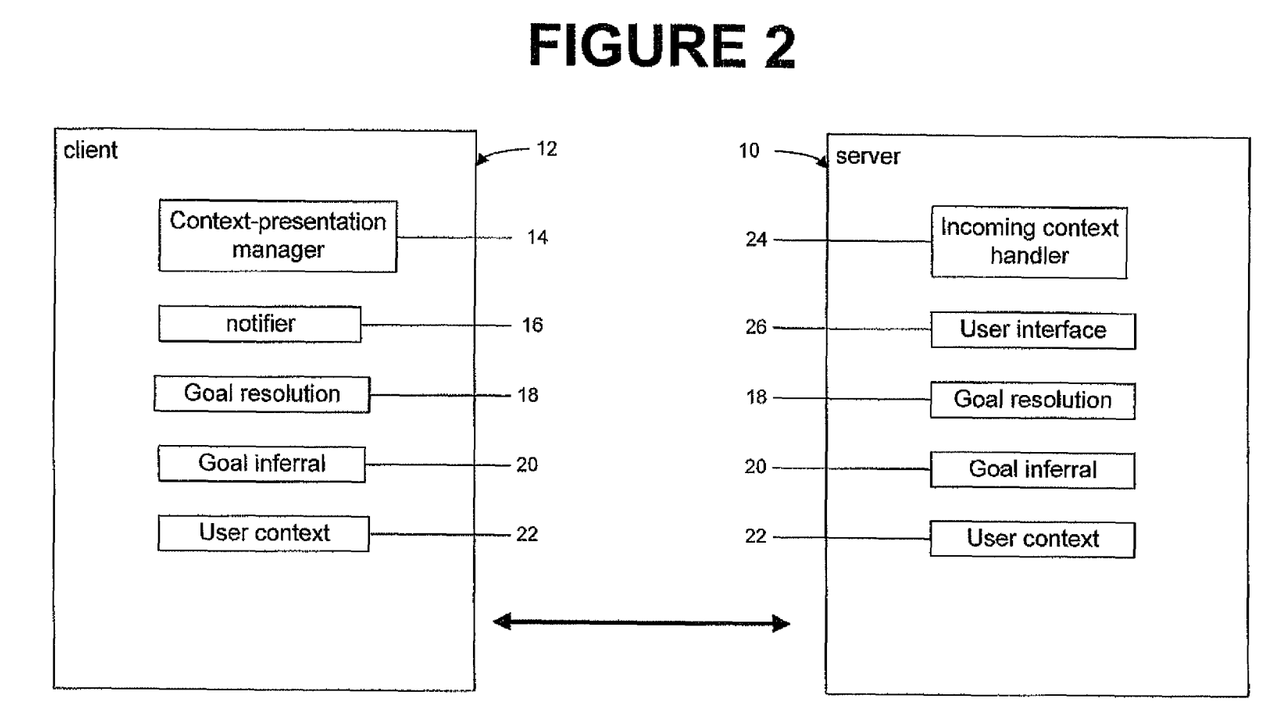
FIG. 2 is a block diagram of components of the present invention.

FIG. 2 shows components of the inventive system. The client 12 has components that can include a context-presentation manager 14 having a queue of notifications and/or suggestions, a notifier 16, goal resolution 18, goal inferral 20, and user context 22. The server 10 components can include incoming context handler and/or context polling 24, visual or user interface 26 for context, query input, etc., goal resolution 18, goal inferral 20, and user context 22. The visual interfaces 26 may be on the client 12 or the server 10, for the purpose of letting the user enter explicit goals. An interface 26 that lays out goals and suggestions in a visually pleasing manner can be seen on the client 12. The interface 26 can show the differing suggestion types organized and presented so as to mirror the important contexts of the user's life, e.g., wellness, finance, daily chores, etc. The differing suggestions can be presented and browsed in aggregated form, by viewing a node higher up in the ontology, or in detailed individual form, by viewing a leaf. In another embodiment, the interface 26 may be a Web page physically stored on either the client 12 or server 10.

The system may detect and compress all specific suggestions into a more general or broad contextual suggestion, or may use some logic to break down the presentation of a general or broad suggestion into some specific ones. These processes of compress and break down may include system inferreals and/or user interactions. Information is exchanged between the client 12 and the server 10 as discussed below.

The context-presentation manager 14 can operate to queue up notifications and/or suggestions that are to be conveyed to the user. At the appropriate time, the context-presentation manager 14 displays all or some of the queued-up suggestions to the user via effective, often hierarchical, layout of the differing types of suggestions, by asking the notifier 16 to render the information using one or more I/O mode. Context presentation manager 14 may organize and present, via notifier 16, context hierarchy, such as by information type, e.g. health, finance, etc., by goal achieved, by time, and/or by importance (user may choose to sort the view on any such parameter). Once a queued-up suggestion is displayed, it may be removed from the queue and possibly saved in an archival form that can be used as a basis for future inference by system components.

The notifier 16 can marshal a visual or ambient notification that the system intends the user to consume, making best use of system resources to adapt the notification to inform the user that there is a suggestion waiting, etc. The vibrate mode, colors, sounds, etc., of the client 12 handset can be operated by the notifier 16.

As events occur, such as the creation of new scheduled calendar events or a change of location by the user in question, they pass through the system and have some effect on the context, e.g. modify it. Given the goal stored by the system for the user, the goal resolution component 18 scours the user context 22, possibly applying rules, to see whether a given goal can be advanced by a given event(s). For example, if event e (that just happened) makes goal g possible, then a notification may be readied. In addition, the system may, by referring to the canonical schemata that define the semantics of event details, determine that some kinds of events (such as goals) are subsumed, preceded or otherwise dependent on others already in the system and exploit this knowledge to the user's benefit (e.g., by improving its suggestions to the user).

The goal inferral component 20 can operate on either the client 12 or the server 10. Given a series of explicit goals, actions, or other descriptors, the goal inferral or inferencing component 20 is able to anticipate sub-goals, pre-conditions and other information typically associated with the goals and actions. For example, if a stated goal is to mail a package before coming home from work, the system needs to create a reminder to make sure the package is with the user when he/she leaves the house in the morning. If the system does not have sufficient domain expertise to figure out sub-goals and pre-conditions, it can send a generic reminder in the morning "do you have all you need to do x y z today" when x, y, z are the goals and actions scheduled for the day, or the relevant period of time. The goal and event hierarchies can be represented in the system in one of the semantic representations available. Resolution of goals to tangible suggestions via the notifier 16 may be achieved through a third party component plugged into the system architecture.

The user context component 22, described in more detail below, stores user context as a series of instances of the meta model of choice. The context is machine readable in this form and the user context component 22 serves as a query interface for the instances.

The incoming context handler and content poller component 24 operates on the server 10. In accordance with business agreements with context providers relating to the user, the incoming context handler 24 can obtain possible incoming messages from these entities and place them into the server 10. The handler portion of the component 24 parses and manages such messages while the poller understands how to poll remote entities for information it may require. Visual interfaces, such as user interface 26, enable the user to manage some aspects of the system. One embodiment allows for the interface 26 to be seen on the Web browser of a mobile device. Web interface and incoming events from external context systems, or distinct internal components, may be unique operations on the server 10.

User context 22 can be a hierarchic, rich state model having subtrees, such that each subtree is an instance of a context ontology and thus permits machine-readable interpretation and inference. Such a structure affords finer and finer aspects of context going downwards in the tree and/or subtree. The context ontologies can include items such as short and long term goals, calendar, tasks, automotive, health-related, etc.

Best practices and/or community-generated ontologies in appropriate forms can be re-factored into the system.

In accordance with the inventive system and method, network connectivity can be as follows. The system can sense, and integrate with, multiple settings from a user's distributed set of personal context, e.g. online calendars, tasks, home appointments, etc., that is, the system is able to read and understand data from users' digital personal context, found in any of the user's networked and local systems that store data. Integration with service data existing on the network typically requires an Application Program Interface (API) and authentication and/or permission. In practice, a business agreement can be arranged.

The system can be plugged into Enterprise or Operator context sensors such as location sensors, e.g. probes, geo-locating systems (GPS, A-GPS). These context sensors can effectively detect the user's current (or latest) location in terms of a well-understood coordinate system. In addition, operations and support systems (OSS systems), e.g. CDR's, etc., can effectively convey some informational context about the user, e.g. calling records.

A tiered model of user context 22 can be constructed using a rich semantic markup language. The model is dynamically and efficiently updated as context changes. At the top level, the ontology is distinctly hierarchical to both divide or distinguish concerns, e.g. medical, location, calendar, home, etc., as well as to allow extensibility, scalability, and navigability. A key part of the system captures the user's "goals" in several ways. These goals can include short term explicitly stated goals, e.g. buy a shirt at The Gap®, short term implicitly inferred goals, e.g. if a shirt is to be bought soon then the credit card must be activated (thus the user sees a notification such as "activate your credit card so that you can buy that shirt you want"), long term explicitly stated goals, e.g., "learn how to play piano", and long term inferred goals. While the goals here are shown typed in English, the system may use a machine readable format, capturing the same semantic.

User goals are understood, at some non-trivial semantic level, by the system. A goal can be entered explicitly by a user for the system, e.g., typed in using the mobile keypad, chosen from a list, or any other mechanism. In addition, a goal can be inferred implicitly by the system, e.g., based on other actions, based on other goals, and/or based on any other context such as physical location. For example, presence in a French book store may lead the system to infer a goal for the user to improve French grammar. The extent to which goal inferencing is made may be configurable.

Note that it is only necessary that the user's goals be understood at some non-trivial semantic level. Toward that end, there are several Artificial Intelligence techniques that can be used to structure the information and/or knowledge associated with goals and the relevant world knowledge which include frames, semantic nets and similar knowledge representation methods. A further basis for machine understanding of typed-in information may come from a schema, taxonomy, ontology, parts-of-speech analysis, or any other well-known natural language processing technique.

The inventive system and method is capable of managing and juggling various overlapping or conflicting goals. A variety of methods to detect and resolve suggestions that conflict with each other, as are known in the art, can be used. Ordering or organizing based on one or more of several dimensions, such as priority, deadline or time, and importance to other goals can be offered. Also, the system could incorporate any state of the art conflict-resolution theories or systems for goal conflicts in research fields, such as cooperative design systems, agent based systems, and/or workflow systems. A simple way to attain conflict resolution would be to have the user and/or administrator setup rules that describe mitigation techniques a priori. In general, the user may or may not be consulted regarding these configurations. However, the user may override any decision. Further, the user's actions may be used as reference for future decisions.

Figure 3:
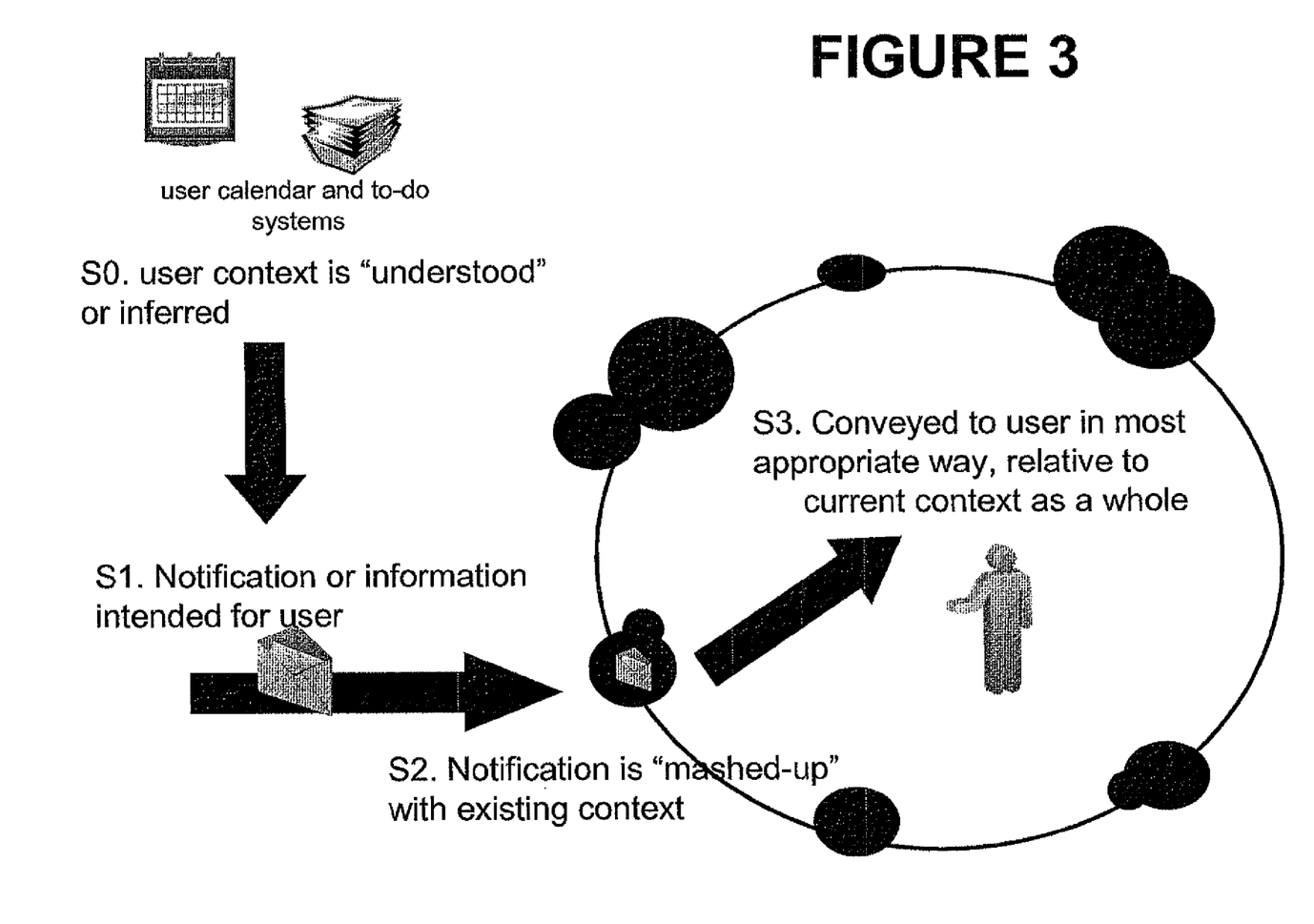
FIG. 3 is a schematic flow diagram of the present invention.

FIG. 3 is a schematic overview of the flow of the inventive system and method. Initially, in step S0, a user context 22, including calendaring and to-do systems, is understood or inferred. In step S1, this context produces notification or information for the user. The notification is mashed-up with existing context in step S2. In step S3, the resulting context is conveyed to the user in a way most appropriate, relative to the current context as a whole.

Figure 4:
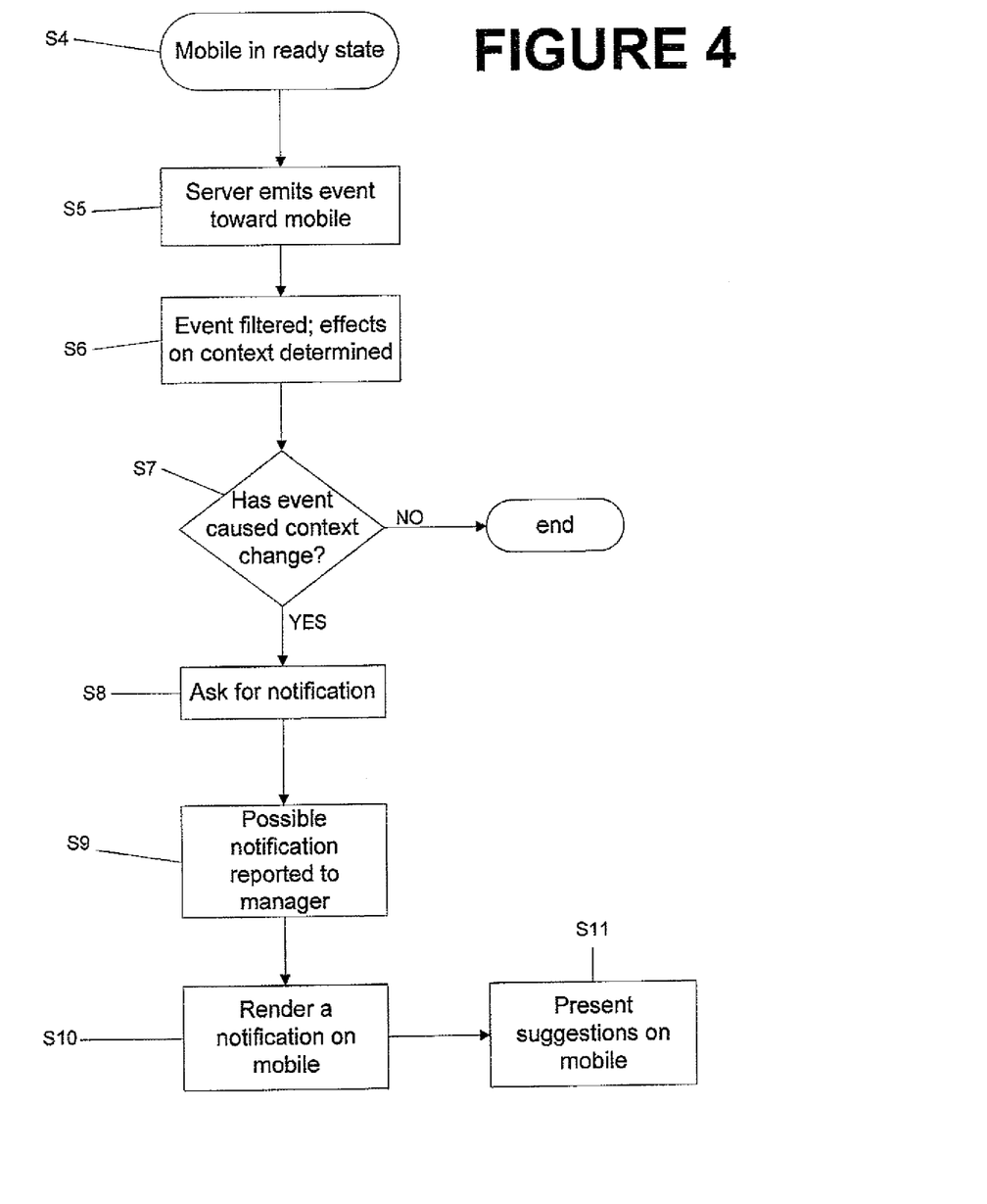
FIG. 4 is a flow diagram of the present invention.

FIG. 4 is flow diagram of the inventive process. In step S4, the client or mobile device 12 is operating in a ready state and the invention components are resident. In step S5, an external system, separate internal component, or server 10 emits an event toward the mobile 12. The event is parsed and filtered through the current context 22 stored on the mobile 12, and the effects of the event on the context 22 are determined in step S6. If a goal-resolution component 18 on the mobile 12 determines that the event has caused a change to context 22 that now allows a goal to be achieved (S7=YES), then the goal-resolution 18 asks for a notification in step S8. The context-presentation manager 14 is told of the possible notification to the user in step S9, and queues it up for presentation at a later moment. At a moment that is correct, possibly determined by rules for such times, in step S10, the notifier or notification component 16 is asked to actually render a notification, for example on the mobile's screen. The system waits until a certain threshold of notifications have been reached, or some aggregation patterns have been reached, e.g. there are several notifications waiting with regards to long-term goal X, so might as well present them now, together. In step S11, a main method for presentation of heterogeneous suggestions that cut across multiple classes of information is available. The presentation manager 14 presents a hierarchical or organized aggregated suggestion in which the user needs to click through a few steps to easily spot the suggestions of interest and/or relevance, easily bypassing the ones that are not. In order to make suggestions that are relevant, the system may use any sort of catalog that allows it to correlate locations with services that may promote open goals.

If the goal-resolution component 18 determines that the event has not caused a change to context 22 (S7=NO), then the process ends.

The system offers an inventive visual notification system that can be differentiated from the current art. The novel visual notification system is able to treat notifications and suggestions differently and categorize them appropriately. The user is allowed to see suggestions from single, aggregated or whole aspects of her context, in contrast to the class of smartphone-based wireless notifications system that typically uses SMS to present information as a flat, limited size format that the system itself does not understand beyond the thin veneer of the syntax. In the inventive system, the context-presentation manager component 14 presents visual components or elements in images, and the information can be presented in various browse-able fashions. The visual elements may display, or let the user choose, one among a variety of use cases discussed in detail below. For example, the display may include a first use case of a single suggestion within a given context, a second use case of a single suggestion within a given context and all its children, i.e., more specific or targeted suggestions, a third use case of all suggestions of the same level of context/detail, cutting across various topics or aspects such as automotive, health/wellness, work, sports, etc., a fourth use case of the single best suggestion at the moment, or other use cases, such as all suggestions within a given context, e.g. all automotive related suggestions, etc. Note that these topics and/or contexts are customizable.

Direct user interaction, which occurs at some point in time, can have four key steps, as follows. Initially, notify the user of waiting suggestions. Next, show a browse-able high level view, sorted on some terms. Next, allow click down into the actual suggestion. Finally, correlate to long and short term goals with actionable steps for each.

One example of the operation of the inventive system is as follows. A user is in the car, commuting to work. The user's calendar has a tele-conference call scheduled, but a high priority user-goal is to visit a client along the route. As the client's area is entered, the system offers to reschedule the tele-conference call and suggests that the user make a stop to visit the client. Visually, the system notifier 16 tells the user that it has suggestions for the user from his "business" context, to which the user can navigate and see all such suggestions, including the above.

In another example, while driving back to the office from a meeting, the user finds out that his next meeting just got cancelled and that he has a free hour. The system recognizes that he needs to get a re-fill for his high blood pressure medication and that the pharmacy is near by, and suggests that he stop at the pharmacy now, during his free hour. In one embodiment, visually, the system notifier 16 understands that the goal fits into a "wellness" semantic and organizes the suggestions in an orderly browse-able fashion for the user.

Figure 5:
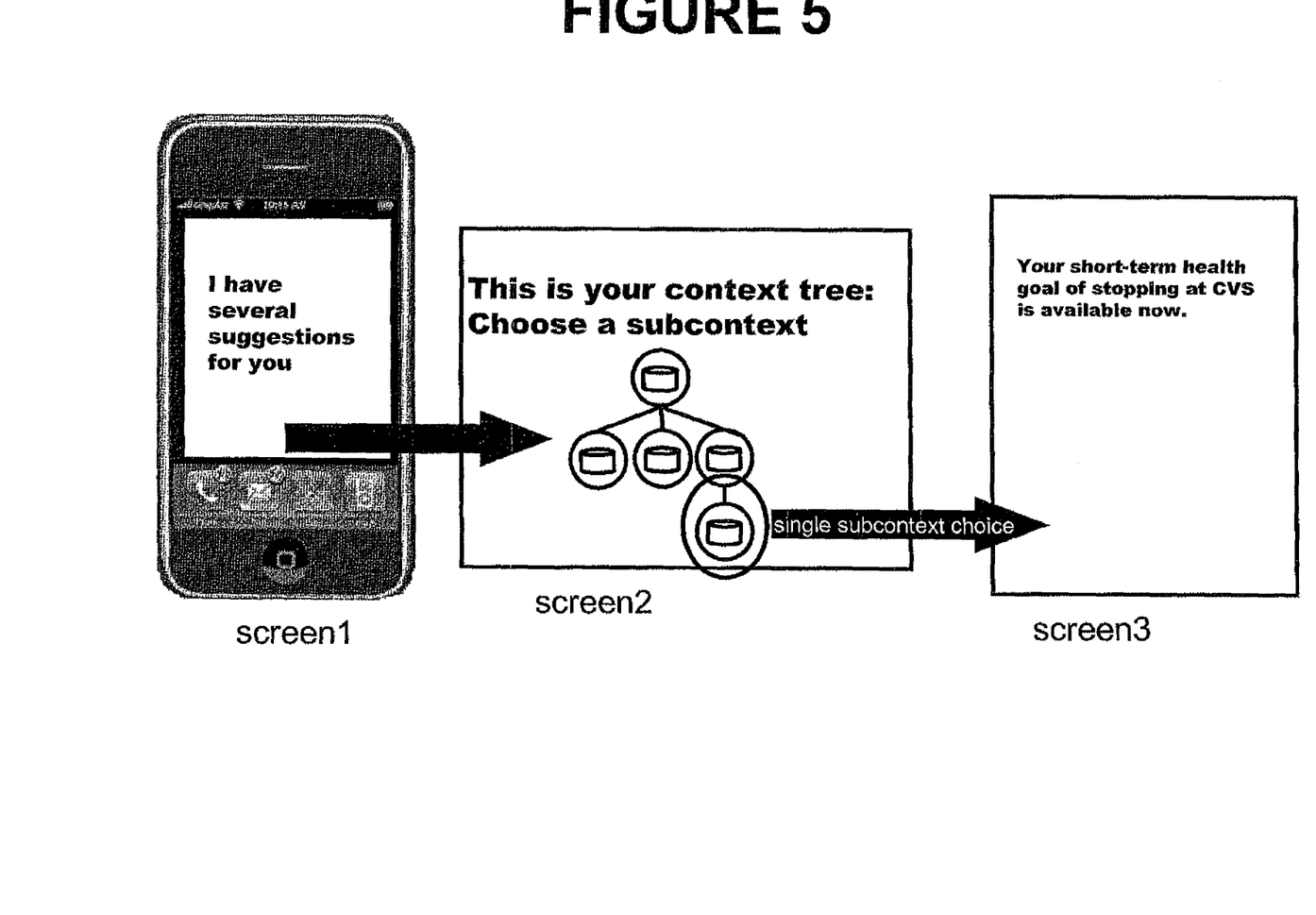
FIG. 5 illustrates a first use case of the present invention.

FIG. 5 illustrates a first use case in which a "single subcontext choice" is selected. On Screen1, "I have several suggestions for you" is displayed. Screen2 displays "This is your context tree: Choose a subcontext." The user makes a single subcontext choice, that is, the user selects a single child subtree from the context tree. In response, Screen3 displays "Your short-term health goal of stopping at CVS is now available". Hence, the user sees only a fine-grained suggestion spanning a narrow semantic.

Figure 6:
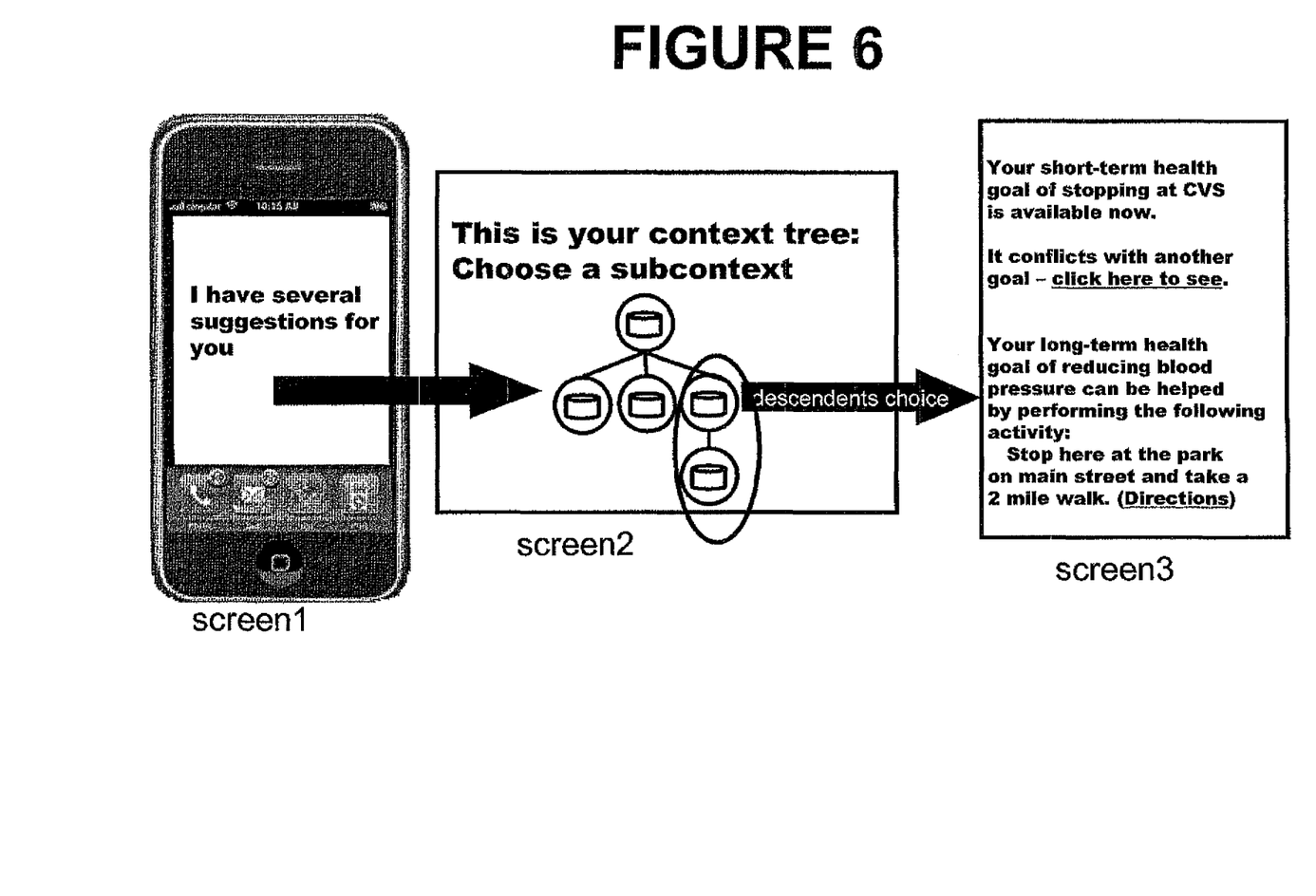
FIG. 6 illustrates a second use case of the present invention.

FIG. 6 illustrates a second use case in which "descendents choice" is selected. Screen1 displays "I have several suggestions for you" and Screen2 displays "This is your context tree: Choose a subcontext." The user selects the descendents choice, that is, the user selects a parent and child subtree pair. In response, Screen3 displays "Your short-term health goal of stopping at CVS is now available. It conflicts with another goal—click here to see (hypertext). Your long-term health goal of reducing blood pressure can be helped by performing the following activity: Stop here at the park on main street and take a 2 mile walk. (Directions (hypertext)). In this case, the user sees a view of multiple suggestions that are all descendents of a single parent in the context tree; in this example, the suggestions are all wellness/health semantics.

Figure 7:
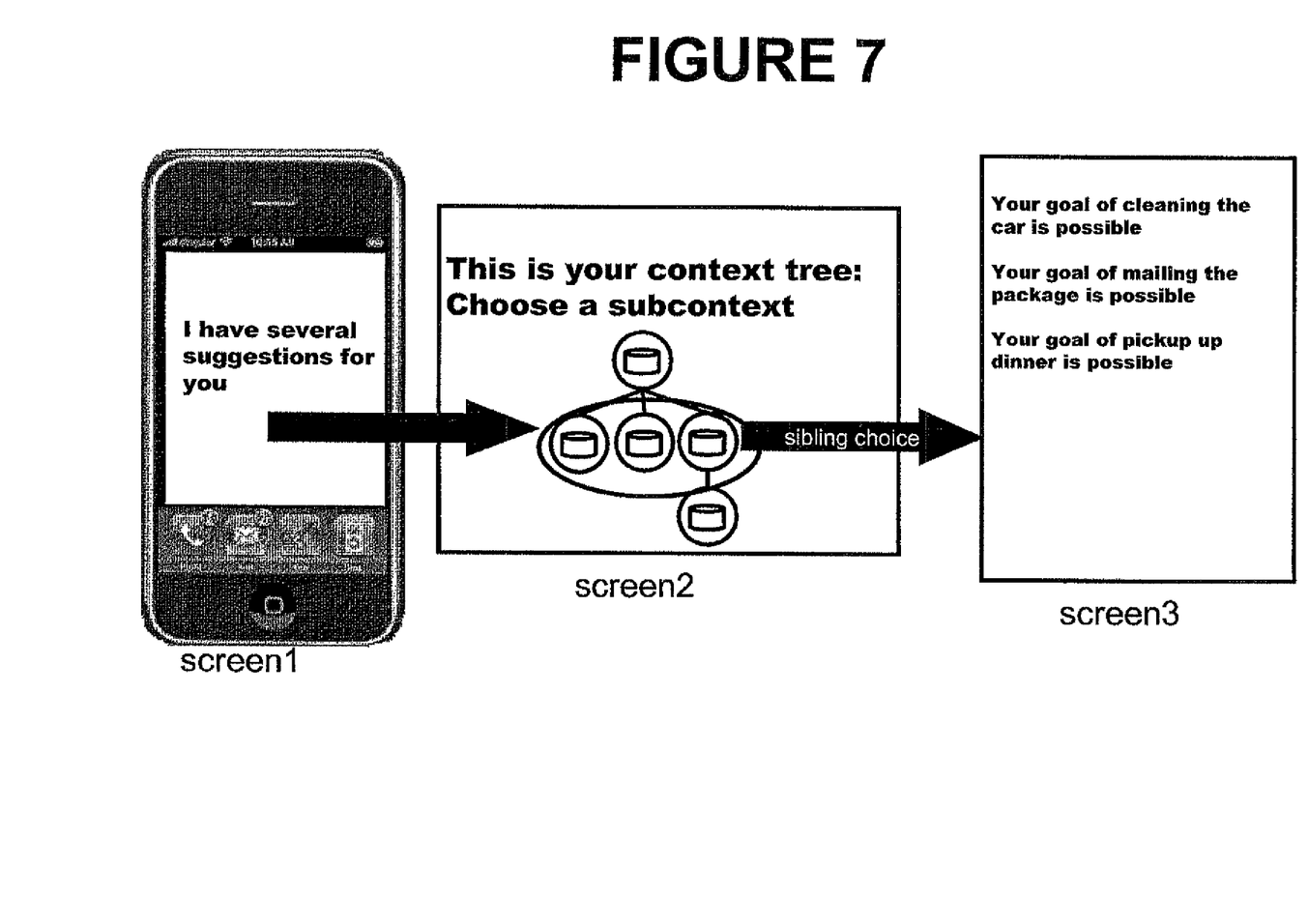
FIG. 7 illustrates a third use case of the present invention.

FIG. 7 illustrates a third use case in which "sibling choice" is selected. Screen1 displays "I have several suggestions for you" and Screen2 displays "This is your context tree: Choose a subcontext." The user selects the sibling choice, that is, the user selects all subtrees on one level, having the same parent. In response, Screen3 displays "Your goal of cleaning the car is possible. Your goal of mailing the package is possible. Your goal of picking up dinner is possible." In this case, the user sees a view of multiple suggestions that are all at about the same level of specificity but cut across semantic domains.

Figure 8:
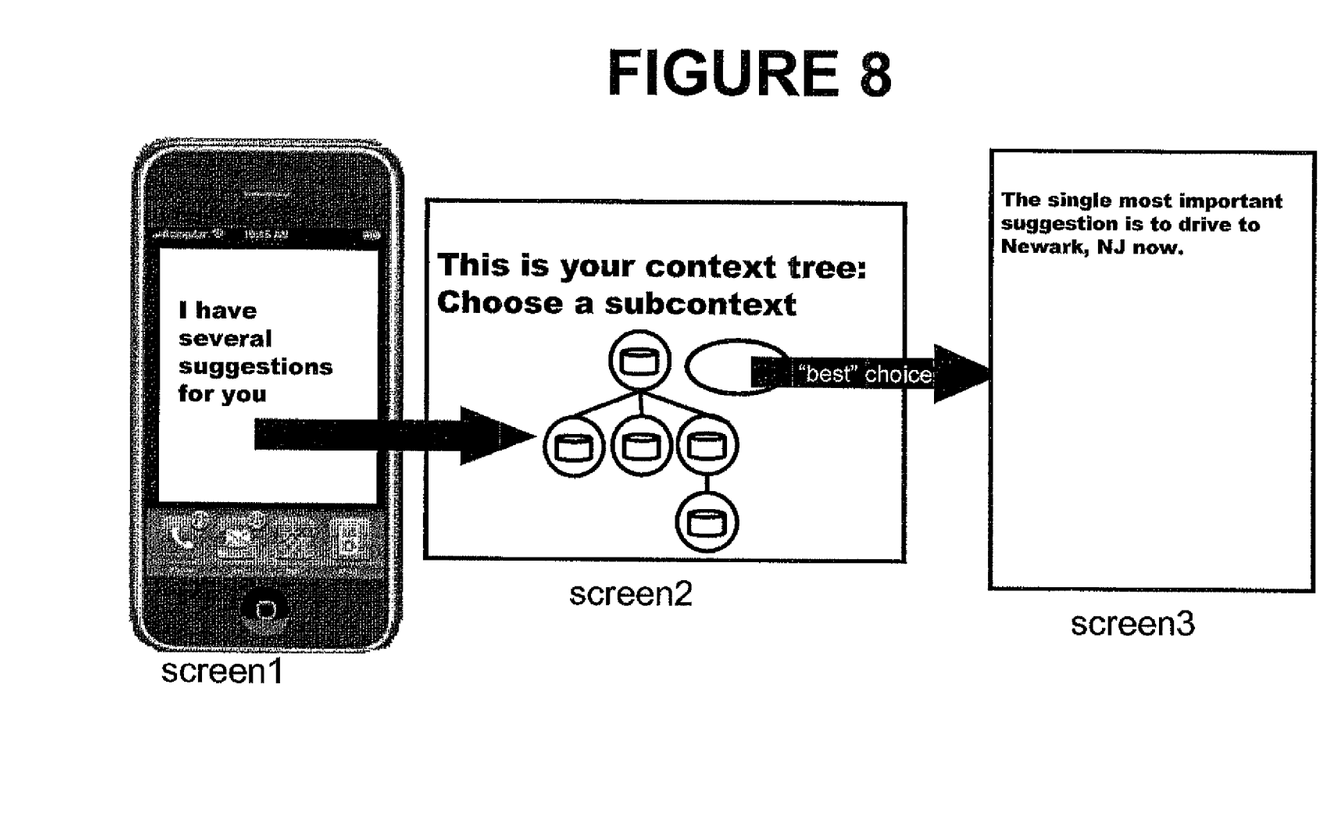
FIG. 8 illustrates a fourth use case of the present invention.

FIG. 8 illustrates a fourth use case in which a "best choice" is selected. Screen1 displays "I have several suggestions for you" and Screen2 displays "This is your context tree: Choose a subcontext." The user selects the best choice by selecting the parent subtree. In response, Screen3 displays "The single most important suggestion is to drive to Newark, N.J. now." In this case, the user sees a single suggestion that the system deems the most important, based on any number of scoring systems configurable by the user.

Figure 9:
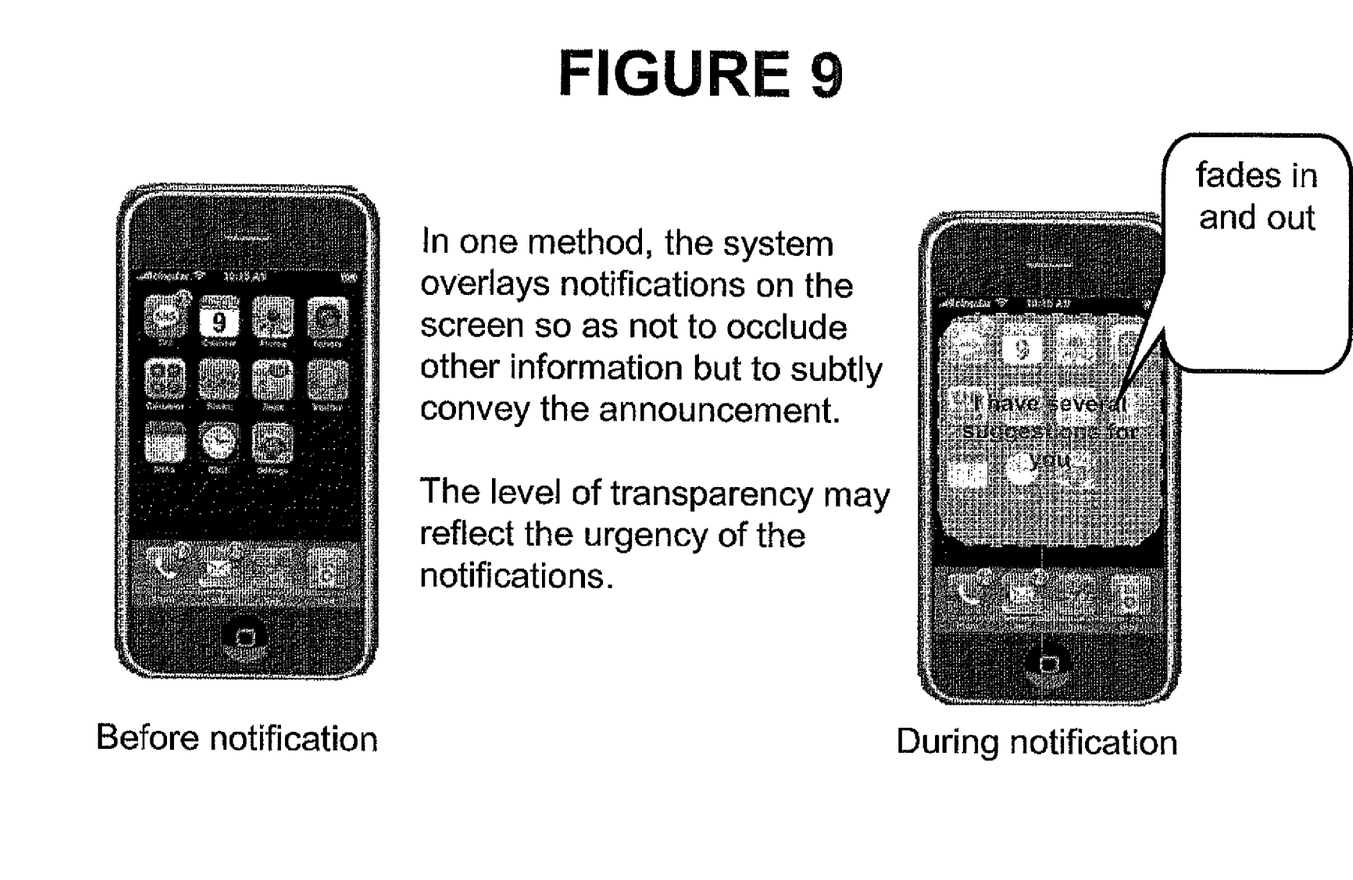
FIG. 9 shows a suggested appearance embodiment of the present invention.

FIG. 9 shows a suggested appearance embodiment for the inventive system. On the left is a screen view before notification, and on the right is the screen view during notification. In this embodiment, the system displays the notifications on the screen as overlays, so as not to occlude other information but to subtly convey the announcement. If desired, the notification can fade in and out. The level of transparency of the notification may reflect its urgency.

This inventive system can be implemented as computer software or a computer readable program for operating on a computer. The computer program can be stored on computer readable medium.

While the present invention has been described in particular embodiments, it should be appreciated that the present invention should not be construed as limited by such embodiments, but rather construed according to the claims below.

What is claimed is:

1. A system for determining and presenting contextual suggestions on a mobile device, comprising:
   a server;
   an incoming context handler residing on the server;
   a context presentation manager residing on a mobile device;
   a notifier residing on the mobile device;
   a hierarchical goal and state management resolution and subsumption function component residing on the mobile device;
   a context tracker that anticipates and maps post-conditions contextual events to user goals;
   dynamic user context, events, and goals each with correlation to particular life aspects; and
   a goal inferral component operable to determine detailed user context based on the event;
   wherein the incoming context handler emits an event toward the mobile device, the goal and state management resolution component and context tracker jointly determine determines if the event causes progress towards or retrogression from user goals, updates context a change in the user context and forwards notification to the context presentation manager, the notifier receives the notification from the context presentation manager and renders the notification on the mobile device and presents the contextual suggestions based on the change in the user context on the mobile device, and
   wherein the contextual suggestions are presented in a hierarchical layout of differing types of the suggestions, the differing types comprising at least information type, goal achieved, time, and importance.

2. The system according to claim 1, further comprising a visual interface enabling user input to the server.

3. The system according to claim 1, wherein the notifier renders the notification by causing the mobile device to perfoui at least one of vibrating, displaying multiple colors, and emitting sounds.

4. The system according to claim 1, wherein the goal resolution component determines the event causes a change in the user context based on the user context and rules.

5. The system according to claim 1, wherein the context-presentation manager queues up the notification until an appropriate time.

6. The system according to claim 1, wherein the contextual suggestions are presented and browsed in aggregate form and in detailed individual form.

7. A method for determining and presenting contextual suggestions on a mobile device, comprising steps of:
   emitting an event from a server toward the mobile device;
   determining, dynamically, detailed context based on the event;
   determining effects of the event upon the progression towards or retrogression from one or more user goals, each with correlation to particular life aspects, expressed for the short or long time frame;
   affecting change to the state of the goals and their relationship to suggestions that induce the user towards goal completion while applying goal subsumption rules;
   tracking the relationship between suggestions in human readable form to state changes that progress or retrogress one or more goals; and
   rendering suggestions on the mobile device such that the suggestions seem to mirror aspects of importance to a user,
   wherein the contextual suggestions are presented in a hierarchical layout of differing types of the suggestions, the differing types comprising at least information type, goal achieved, time, and importance.

8. The method according to claim 7, further comprising the steps of:
   parsing and filtering the event; and
   determining the effects of the event on the context.

9. The method according to claim 7, wherein the step of rendering suggestions is performed by causing the mobile device to perform at least one of vibrating, displaying multiple colors, and emitting sounds.

10. The method according to claim 7, further comprising a step of queuing up the notification until an appropriate time.

11. The method according to claim 7, further comprising the steps of:
   detecting and compressing the contextual suggestions into one general contextual suggestion; and
   breaking down another general contextual suggestion into more than one contextual suggestions, wherein the steps of detecting and breaking down are performed by at least one of system inferreals and user interactions.

12. A non-transitory computer readable medium having computer readable program code for operating on a computer for determining and presenting contextual suggestions on a mobile device, the program comprising steps of:
   emitting an event from a server toward the mobile device;
   determining effects of the event upon the progression or regression of one or more user goals, each with correlation to particular life aspects, expressed for the short or long time frame;
   determining, dynamically, detailed context based on the event;
   affecting change to the state of the goals and their relationship to suggestions that induce the user towards goal completion while applying goal subsumption rules;
   tracking the relationship between suggestions in human readable form to state changes that progress towards or retrogress from one or more goals; and
   rendering suggestions on the mobile device such that the suggestions seem to mirror aspects of importance to a user,
   wherein the contextual suggestions are presented in a hierarchical layout of differing types of the suggestions, the differing types comprising at least information type, goal achieved, time, and importance.

13. The program according to claim 12, further comprising the steps of:
   parsing and filtering the event; and
   determining the effects of the event on the context.

14. The program according to claim 12, wherein the step of rendering suggestions is performed by causing the mobile device to perform at least one of vibrating, displaying multiple colors, and emitting sounds.

* * * * *

UNITED STATES PATENT AND TRADEMARK OFFICE
CERTIFICATE OF CORRECTION

PATENT NO. : 8,694,901 B2  
APPLICATION NO. : 12/182636  
DATED : April 8, 2014  
INVENTOR(S) : Falchuk et al.

Page 1 of 1

It is certified that error appears in the above-identified patent and that said Letters Patent is hereby corrected as shown below:

In the Claims

Column 8, Line 44, in Claim 1, delete "determine determines" and insert -- determines --, therefor.

Column 8, Line 59-60, in Claim 3, delete "perfouii" and insert -- perform --, therefor.

Signed and Sealed this  
Eighteenth Day of November, 2014

Michelle K. Lee  
*Deputy Director of the United States Patent and Trademark Office*